United States Patent
Haïdar et al.

(10) Patent No.: US 7,426,075 B2
(45) Date of Patent: Sep. 16, 2008

(54) WAVE GENERATION BY WAVE PROPAGATION PHASE-SHIFT COMPENSATION IN AN NON-LINEAR OPTICAL MEDIUM

(75) Inventors: Riad Haïdar, Paris (FR); Emmanuel Rosencher, Bagneux (FR); Jérôme Primot, Chatillon (FR)

(73) Assignee: ONERA, Chatillon (FR)

( * ) Notice: Subject to any disclaimer, the term of this patent is extended or adjusted under 35 U.S.C. 154(b) by 207 days.

(21) Appl. No.: 11/379,876

(22) Filed: Apr. 24, 2006

(65) Prior Publication Data
US 2006/0238854 A1    Oct. 26, 2006

(30) Foreign Application Priority Data
Apr. 25, 2005    (FR) .................................. 05 04145

(51) Int. Cl.
G02F 1/35    (2006.01)
G02F 2/02    (2006.01)
G02B 6/00    (2006.01)

(52) U.S. Cl. ...................................... 359/326; 385/122
(58) Field of Classification Search ................. 385/122; 359/326–332
See application file for complete search history.

(56) References Cited

U.S. PATENT DOCUMENTS

| | | | | |
|---|---|---|---|---|
| 3,983,406 A | * | 9/1976 | Lax et al. | 359/326 |
| 5,151,965 A | * | 9/1992 | Rikken et al. | 385/122 |
| 5,640,480 A | | 6/1997 | Komine | 385/122 |

OTHER PUBLICATIONS

R. Haidar et al., "Fresnel phase matching for three-wave mixing in isotropic semiconductors," Journal Optical Society of America, vol. 21, No. 8, pp. 1522-1534, Aug. 2004.
H. Komine, "Quasi-phase-matched second-harmonic generation by use of a total-internal-reflection phase shift in gallium arsenide and zinc selenide plates," Optics Letters, vol. 2, No. 9, pp. 661-663, May 1, 1998.
D. Pascal et al., "Optimized coupling of a Gaussian beam into an optical waveguide with a grating coupier: comparision of experimental and theoretical results," Applied Letters, vol. 36, No. 12, pp. 2443-2447, Apr. 20, 1997.
Martin M. Fejer et al., "Quasi-Phase-Matched Second Harmonic Generation: Tuning and Tolerances," IEEE Journal of Quantum Electronics, vol. 28, No. 11, pp. 2631-2654, Nov. 1992.

(Continued)

*Primary Examiner*—Sung Pak
*Assistant Examiner*—Daniel Petkovsek
(74) *Attorney, Agent, or Firm*—Lowe Hauptman Ham & Berner LLP

(57) ABSTRACT

In a nonlinear optical medium such as the gallium arsenide, two collinear incident monochromatic waves are injected to generate a monochromatic wave. The medium induces between the three waves a propagation phase-shift that has a value $\pi$ if the three waves travel a coherence length in the medium and that is compensated at the value 0 modulo $2\pi$ each time that the three waves have travelled a periodic distance in the medium. In order to significantly increase the conversion efficiency, the periodic distance between two successive bounces of total internal reflection of the waves in zig-zag is strictly less than the coherence length. The high conversion efficiency on a very short material length leads to product high-power coherent optical sources particularly with wavelengths of approximately 10 μm.

16 Claims, 2 Drawing Sheets

OTHER PUBLICATIONS

R. Haidar et al., "Nonresonant quasi-phase matching in GaAs plates by Fresnel birefringence," Applied Physics Letters, vol. 83, No. 8, pp. 1506-1508, Aug. 25, 2003.

J. A. Armstrong et al., "Interactions between light waves in a nonlinear dielectric," Physical Review, vol. 127, No. 6, pp. 1918-1939, Sep. 15, 1962.

* cited by examiner

WAVE GENERATION BY WAVE PROPAGATION PHASE-SHIFT COMPENSATION IN AN NON-LINEAR OPTICAL MEDIUM

BACKGROUND OF THE INVENTION

1. Related Applications

The present application is based on, and claims priority from, French Application Number 0504145, filed Apr. 25, 2005, the disclosure of which is hereby incorporated by reference herein in its entirety.

2. Field of the Invention

This invention relates to the parametric generation of a monochromatic wave from the interaction of two incident collinear monochromatic waves injected into a medium with non-linear optical properties.

One of the application fields of the invention is the band III of the spectrum; that is, the wavelengths included between 8 µm and 12 µm, for which a few coherent sources that can be matched are currently composed of semiconductor lasers such as quantum cascade lasers.

Nevertheless, the optical parametric generation offers a promising research area, even if it requires materials that are in shortage.

3. Description of the Prior Art

Thus, the electronic industry's usual semiconductors, such as the gallium arsenide GaAs, zinc selenide ZnSe or indium phosphide InP, are excellent candidates for the parametric conversion of an optical radiation of the band I of the spectrum; that is, wavelengths included between 1 µm and 3 µm, to band III. Indeed, the previous-mentioned semiconductors (i) present non-linear efficiency levels from among the largest ones in optical materials, (ii) have transparency spectral areas, and therefore spectral matching, that are very extensive, for example from 0.5 µm to 20 µm for ZnSe, (iii) benefit from a very advanced technology, inherited from microelectronic technology, (iv) are easily available in the world market and are not subject to any embargos, and (v) are potentially inexpensive.

These materials are nevertheless isotropic, which prohibits any phase matching scenario by natural birefringence. To resolve this limitation, the article by J. A. Armstrong et al., "Interactions between Light Waves in a Nonlinear Dielectric", Physical Review, Vol. 127, No. 6, p. 1918 to 1939, Sep. 15, 1962, proposes an alternative technique called from the quasi-phase matching (QPM) that perform an efficient conversion. The QPM consists of compensating the wave propagation phase-shift due to the index dispersion, by artificially and periodically adding an additional phase-shift. This periodic rephasing of waves is imposed after a periodic distance that defines segments along the material by the waves. These segments individually maximise the conversion efficiency and have a length equal to an odd number of coherence lengths.

According to the article by R. Haidar et al, "Fresnel phase matching for three-wave mixing in isotropic semiconductors", Journal Optical Society of America, Vol. 21, No. 8, p. 1522 to 1534, August 2004, the quasi-phase matching QPM resorts to the total internal reflection in the nonlinear medium: the phase-shift that each wave undergoes upon reflection compensates the phase-shift due to the propagation in a nonlinear optical material. Phase matching is obtained by what is called the "Fresnel birefringence", because each wave undergoes a phase-shift that depends particularly on its frequency and on its polarization. The distance between two "bounces" against the surfaces of a plate of nonlinear optical material is, each time, chosen strictly equal to an odd number of coherence lengths for a resonant QPM, or close to an odd number of coherence lengths for a non-resonant QPM in order to maximise the conversion on each basic segment between two successive bounces. The wave generated on output is therefore the result of the constructive interference between the individual contributions of all the waves.

The conversion efficiency $\eta$ of a wavelength converter in QPM is proportional to the square of the number N of rephasing and therefore of the number of bounces in the case of the QPM by total internal reflection: $\eta \propto N^2$, regardless of the thickness of the material crossed. The conversion efficiency of the QPM nonetheless remains limited. In the best cases, for a given material length, the conversion efficiency cannot exceed 40% of the efficiency that would allow perfect phase matching PPM, obtained for example by natural birefringence.

OBJECT OF THE INVENTION

The object of the invention is to significantly increase the conversion efficiency per length unit. Contrary to preconceived ideas, this object is not necessarily fulfilled by maximising the conversion efficiency of each basic segment between two successive bounces.

SUMMARY OF THE INVENTION

Accordingly, there is provided a method for generating, from first and second collinear incident monochromatic waves crossing a nonlinear optical medium, a third monochromatic wave, the medium inducing between the three waves a propagation phase-shift that has a value $\pi$ if the three waves travel a coherence length in the medium and that is compensated at the value 0 modulo $2\pi$ each time that the three waves have travelled a periodic distance in the medium. The method is characterised in that the periodic distance is strictly less than the coherence length.

As will be seen below, the coherence length is a distance in the nonlinear optical medium inside of which the interaction between the three waves is constructive and therefore the conversion efficiency increases. According to the invention, the propagation phase shifting between the three waves is compensated at the value 0 modulo $2\pi$ by a total internal reflection of the three waves on parallel surfaces that border the nonlinear optical medium and removed from a thickness that is less than the periodic distance.

Phase matching according to the invention is therefore "fractional" in the sense that the periodic distance between two successive bounces is a fraction of the coherence length, for example approximately half the coherence length, which allows increasing the linear conversion efficiency of the isotropic or anisotropic nonlinear optical medium, and make it comparable to the conversion efficiency that would be ideally obtained by perfect phase matching. The low values of the periodic distance favour better conversion efficiency. The invention allows obtaining, for a given material, linear conversion efficiencies comparable to those of perfect phase matching, and that are always greater than those for the usual quasi-phase matching. Typically, the linear conversion efficiency can reach twice that obtained for quasi-phase matching QPM.

The increase in linear efficiency due to the fractional phase matching according to the invention satisfies an important stake relative to the production of high-power coherent optical sources that depend on the linear conversion efficiencies of materials. To pass from optical parametric generation to the notably more efficient optical parametric oscillation, indeed it is necessary to obtain strong conversion efficiency on the shortest material length possible. The efficiencies obtained by the usual quasi-phase matching QPM techniques for generating a wave in certain regions of the spectrum, such as band III for wavelengths from the tenth micrometer, generally remain weak. Fractional phase matching according to the invention allows resolving this limitation.

The invention also relates to a wave generating device for carrying out the method of the invention. It includes a nonlinear optical medium in which two collinear incident monochromatic waves are injected in order to generate a monochromatic wave and that induces between the three waves a propagation phase-shift that has a value $\pi$ if the three waves travel a coherence length in the medium and that is compensated at the value 0 modulo $2\pi$ each time that the three waves have travelled a periodic distance in the medium. The wave generating device is characterised in that the periodic distance is strictly lower than the coherence length.

The nonlinear optical medium such as a semiconductor plate that can have a thickness of less than 50 µm approximately can be limited by two large parallel surfaces between which the waves are reflected according to a reflection angle more than total critical reflection angles in the nonlinear optical medium for the three waves and that are distant from a thickness equal to the product of the periodic distance and the cosine value of the reflection angle.

BRIEF DESCRIPTION OF THE DRAWINGS

Other features and advantages of the present invention will become more clearly apparent on reading the following description of plural preferred embodiments of the invention, given by way of nonlimiting examples, with reference to the corresponding appended drawings, in which.

DESCRIPTION OF THE PREFERRED EMBODIMENTS

Figure 1:
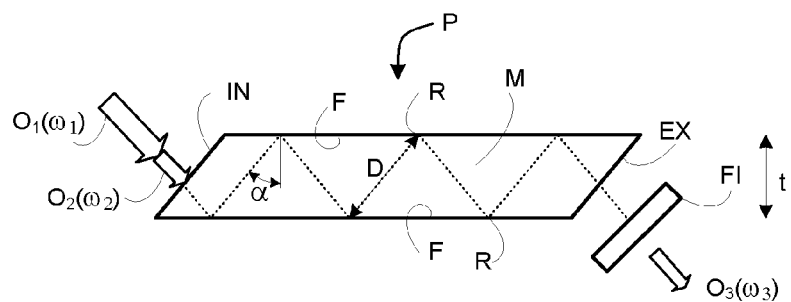
FIG. 1 is a schematic longitudinal section of a wavelength converter for the wave generation device according to the invention.

According to a preferred embodiment of the invention shown in FIG. 1, a wavelength converter that carries out the monochromatic wave generation method includes an isotropic or anisotropic, optical or electro-optical material M in the form of a thin plate P as a nonlinear optical medium.

As known, two incident collinear monochromatic electromagnetic waves $O_1$ and $O_2$ with wavelengths $\lambda_1$ and $\lambda_2$ are injected at an input end of the wavelength converter through a wave injecting arrangement IN. Then, the waves $O_1$ and $O_2$ interacting in a nonlinear manner between them by combination of wavelengths in the converter in order to form a third monochromatic electromagnetic wave $O_3$ having a wavelength $\lambda_3$. Finally, the wave $O_3$ is extracted at an output end of the converter opposite the input end through a wave extracting arrangement EX, and isolated using a filtering arrangement FI. The third wave $O_3$ is collinear to the two other waves $O_1$ and $O_2$ when the three wave travel across the nonlinear material M. The frequencies $F_1 = \omega_1/2\pi = k_1 c/(2\pi n_1)$, $F_2 = \omega_2/2\pi = k_2 c/(2\pi n_2)$ and $F_3 = \omega_3/2\pi = k_3 c/(2\pi n_3)$ corresponding to wavelengths $\lambda_1, \lambda_2, \lambda_3$ verify the relationship:

$$F_3 = F_1 \pm F_2, \text{ that is } \omega_3 = \omega_1 \pm \omega_2,$$

where $k_1 = 2\pi n_1/\lambda_1$, $k_2 = 2\pi n_2/\lambda_2$ and $k_3 = 2\pi n_3/\lambda_3$ are the wave vectors, $n_1$, $n_2$ and $n_3$ are refraction indexes of the material M for frequencies $F_1$, $F_2$ and $F_3$, and c is the light velocity in the vacuum.

For example, waves $O_1$ and $O_2$ are optical beams close to the infrared emitted by two laser sources and have their wavelengths $\lambda_1$ and $\lambda_2$ lying between 1 µm and 3 µm, and the wavelength $\lambda_3$ of wave $O_3$ is included in band III of the spectrum, that is a wavelength $\lambda_3$ lying between 8 µm and 12 µm. The nonlinear optical material M is, for example, an isotropic semiconductor such as gallium arsenide GaAs or zinc selenide ZnSe, or a birefringent ferroelectric material. The plate has a constant thickness t of approximately several tens or hundreds of micrometers. The plate has two large parallel surfaces F that form material—air dioptres (or another dielectric, as long as its index is less than that of the plate material) with a large optical quality in order to reflect in zig-zag from one "bounce" R to another the waves thus guided in the material M from the wave injecting arrangement IN to the wave extracting arrangement EX. The plate P in which the wave conversion is performed therefore behaves like a multimode waveguide for each wave $O_1$, $O_2$, $O_3$ that is totally reflected on the large surfaces F with a reflection angle $\alpha$ greater than a respective critical angle of total reflection in the nonlinear optical material M.

In a variation, an incident monochromatic electromagnetic wave is injected at the input end of the wavelength converter through a wave injection arrangement IN in order to generate, in the converter, two collinear monochromatic electromagnetic waves in which at least one is extracted at the output end of the converter.

The invention is not limited to the above-mentioned wavelength values. Wavelength values $\lambda_1$, $\lambda_2$ and $\lambda_3$ of the electromatic waves $O_1$, $O_2$, and $O_3$ can indistinctly belong to any spectral band, from ultraviolet to infrared, including the visible domain. A priori, wavelengths $\lambda_1$, $\lambda_2$ and $\lambda_3$ differ between them. Nevertheless, wavelength $\lambda_1$ and $\lambda_2$ of the collinear waves $O_1$ and $O_2$ can be the same and wavelength $\lambda_3$ can be larger or smaller than at least one of the wavelengths $\lambda_1$ and $\lambda_2$. The wavelength converter can therefore increase the wave, or decrease the wavelength.

Figure 2:
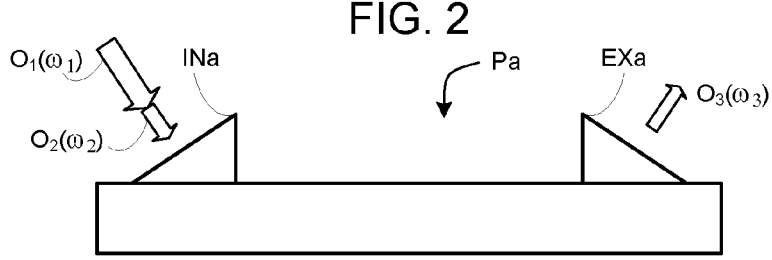
FIGS. 2, 3 and 4 schematically illustrate an arrangement for injecting waves and an arrangement for extracting waves for the wavelength converter respectively according to three embodiments of the invention.
Figure 3:
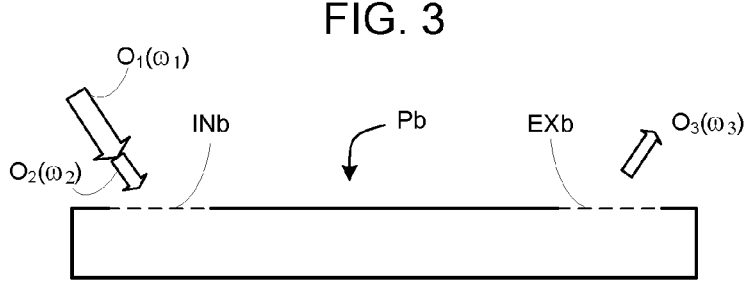
Figure 4:
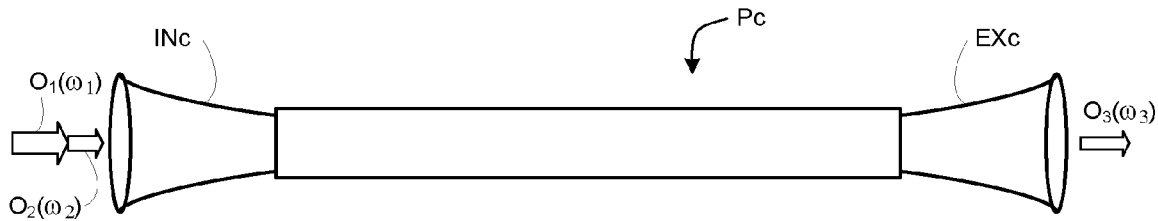

In a schematic manner in FIG. 1, the wave injecting arrangement IN and the wave extracting arrangement EX are represented by bevelled edges of the thin plate P. Nevertheless, in practice, the waves are injected and extracted according to one of the following three embodiments:

injection of waves $O_1$ and $O_2$ by input coupling prism INa and extraction of wave $O_3$ by output coupling prism EXa at the ends of one of the surfaces of the plate Pa, according to the article by H. KOMINE "Quasi-phase-matched second-harmonic generation by use of a total-internal-reflection phase shift in gallium arsenide and zinc selenide plates", Optics Letters, Vol. 3, No. 9, p. 661 to 663, May 1, 1998, as shown in FIG. 2;

injection of waves $O_1$ and $O_2$ by macroscopic input grating coupler INb and extraction of wave $O_3$ by macroscopic output grating coupler EXb, as shown in FIG. 3; the grating couplers result from impressions in the thin layers on the ends of one of the surfaces of the plate Pb in order to form corrugated areas according to the article by D. PASCAL et al. "Optimized coupling of a Gaussian beam into an optical waveguide with a grating coupler: comparison of experimental and theoretical results", Applied Letters, Vol. 36, No. 12, p. 2443 to 2447, Apr. 20, 1997;

direct injection of waves $O_1$ and $O_2$ by focalisation of an angular acceptance cone INc of the plate Pc, without previous shaping of waves $O_1$ and $O_2$ into beams, in a manner similar to the injection of light in an optical fiber, and extraction of wave $O_3$ by an output cone EXc, as shown in FIG. 4.

The wave generation device according to the invention is not limited to the above-mentioned couples for a wave injecting arrangement IN and a wave extracting arrangement EX at the input and output of the wavelength converter. According to two other examples, the wave generation device includes a coupling prism and a grating coupler. Either, on input, the coupling prism injects the two incident waves into the non-linear optical medium M and on output the grating coupler extracts the wave to be generated from the medium, or on input the grating coupler injects the two incident waves into the medium and on output the coupling prism extracts the wave to be generated from the medium.

Returning to FIG. 1, the dependency of the intensity $I_3$ of the output wave $O_3$ resulting from the interaction of the two incident waves $O_1$ and $O_2$ with respective intensities $I_1$ and $I_2$ in the nonlinear optical material M of the plate P in which the wave are propagated according to a given wavelength LP, corresponding to N bounces R of the waves, can be written in the following manner, assuming a total internal reflection without loss for each wave at each bounce R and therefore a reflection coefficient equal to 1 for each wave $O_1$, $O_2$ and $O_3$:

$$I_3 = \frac{Z_0 \omega_3^2}{2c^2} \frac{d_{eff}^2}{n_1 n_2 n_3} (ND)^2 \left( \frac{\sin \frac{\Delta k D}{2}}{\frac{\Delta k D}{2}} \right)^2 \left( \frac{\sin\left(\frac{N \Delta \phi}{2}\right)}{N \sin\left(\frac{\Delta \phi}{2}\right)} \right)^2 I_1 I_2 \quad (1)$$

where $I_1$, $I_2$ and $I_3$ designate the intensities of waves $O_1$, $O_2$ and $O_3$, respectively, $Z_0$ is the vacuum impedance (377 Ohms), $d_{eff}$ is the nonlinear electrical susceptibility of approximately 2 of the material M, N is the number of bounces R inside the plate P for the given length LP=ND, D is the distance between two successive bounces, $\Delta k$ is the phase mismatch between the three waves, whether according to a first example $\Delta k=(k_1-k_2-k_3)$, assuming that $k_1 > k_2 \geq k_3$ and therefore $F_1 > F_2 \geq F_3$ for a converter that increases the wavelength, or according to a second example $\Delta k=(k_3-(k_2+k_1))$, assuming that $k_3 > k_2 \geq k_1$ and therefore $F_3 > F_2 \geq F_1$ for a converter that decreases the wavelength, and $\Delta \Phi$ is the overall phase-shift equal to $\Delta k D + \Phi_F + \epsilon \pi$ that the waves undergoes between two successive bounces R, with $\Phi_F$ the differential Fresner phase-shift of the three waves in interaction, or $\Phi_F = \phi_1 - \phi_2 - \phi_3$ according to the first example above or $\Phi_F = \phi_3 - \phi_2 - \phi_1$ according to the second example above are the wave phase-shifts $O_1$, $O_2$ and $O_3$ at the reflection, and $\epsilon$ represents the possible sign inversion of the coefficient $d_{eff}$ at the total internal reflection, i.e. $\epsilon=1$ if the sign change, and $\epsilon=0$ otherwise.

In order to ensure guiding of the three waves $O_1$, $O_2$ and $O_3$ in the plate P acting as a multimode waveguide, and therefore the simultaneous existence of modes at frequencies $F_1$, $F_2$ and $F_3$ of waves $O_1$, $O_2$ and $O_3$, the following expressions must be satisfied:

$K_1 D + \phi_1 = 0$ modulo $\pi$, $K_2 D + \phi_2 = 0$ modulo $\pi$, $K_3 D + \phi_3 = 0$ modulo $\pi$.

The first two expressions above recall that the two incident waves $O_1$ and $O_2$ can have different physical characteristics, for example, crossed polarizations, which lead to different Fresnel phase-shifts.

According to the prior art, the resonance condition and therefore the phase-matching condition between two successive bounces separated from the periodic distance D forces the global phase-shift $\Delta \Phi = \Delta k D + \Phi_F + \epsilon \pi$ that the waves between two bounces undergo to be a multiple of $2\pi$, i.e. $\Delta \Phi = 0$ modulo $2\pi$. Under this condition, the intensity $I_3$ of the output wave $O_3$ according to expression (1) becomes:

$$I_3 = \frac{Z_0 \omega_3^2}{2c^2} \frac{d_{eff}^2}{n_1 n_2 n_3} (ND)^2 \left( \frac{\sin \frac{\Delta k D}{2}}{\frac{\Delta k D}{2}} \right)^2 I_1 I_2 \quad (2)$$

Therefore, the intensity $I_3$ of the output wave $O_3$ follows the quadratic increase of the number of bounces R; i.e. $I_3 \propto N^2$, and is as large as the number of bounces is large.

The conversion efficiency $\eta = I_3/(I_1 I_2)$ by length unit that the invention expects to maximise is obtained from expression (2):

$$\eta = \eta_{APP} \left( \frac{\sin \frac{\Delta k D}{2}}{\frac{\Delta k D}{2}} \right)^2 \quad (3)$$

where $$\eta_{APP} = \frac{Z_0 \omega_3^2}{2c^2} \frac{d_{eff}^2}{n_1 n_2 n_3} (ND)^2$$

designates the conversion efficiency of the Perfect Phase Matching PPM, obtained, for example by a birefringent material, and D is the distance between two rephrases of the waves. The distance D corresponds to the distance between two bounces in the case of the quasi-phase matching QPM by total internal reflection, or at the length of each "domain" in the QPM by periodic domain inversion with a ferroelectric material such as lithium niobate $LiNbO_3$, according to the article by Martin M. FEJER et al, "Quasi-Phase-Matched Second Harmonic Generation: Tuning and Tolerances", IEEE JOURNAL OF QUANTUM ELECTRONICS, Vol. 28, No. 11, p. 2631 to 2654, November 1992.

Figure 5:
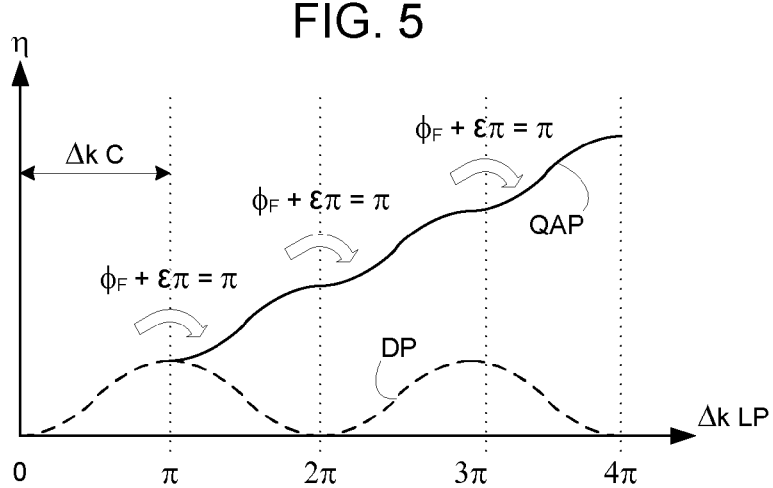
FIG. 5 is a diagram of the conversion efficiency as a function of the propagation phase shifting for a phase mismatch and quasi-phase matching so that the distance of periodic rephase of waves is equal to the coherence length.

In a standard nonlinear optical and birefringent material, there is a phase mismatch DP and the conversion efficiency $\eta$ varies in a sinusoidal manner with a propagation phase-shift period Δk LP=Δk 2C=2π, as indicated with a dashed line in FIG. 5. C=π/Δk is the coherence length corresponding at one time to a semi-period during which the interferences between the three waves $O_1$, $O_2$ and $O_3$ are constructive and the conversion efficiency increases up to an inflection point, and at another time to a semi-period during which the interferences between the three waves $O_1$, $O_2$ and $O_3$ are destructive and the conversion efficiency decreases from the inflection point until it reaches zero.

The situation of the quasi-phase matching QPM is obtained by periodically compensating this propagation phase-shift. In an artificial manner, at every second semi-period, a domain inversion can be created in order to only keep a single constructive interaction between the three waves $O_1$, $O_2$, and $O_3$ and an increase in the conversion efficiency η after each inflection point for Δk D=nπ, with n being a positive integer, as indicated with a solid line in FIG. 5. For example, according to the prior art, a high electrical voltage is applied to the ferroelectric material between the first and second bounces, i.e. between C=π/Δk and 2C=2π/Δk, and then between the third and fourth bounces, i.e. between 3C=3π/Δk and 4C=4π/Δk, and so on, in order to artificially add a phase-shift of π and maintain the increase in the conversion efficiency. Thus, according to expression (3), the conversion efficiency of a Quasi-Phase Matching (QPM) is reached if the propagation phase-shift at the value Δk D/2=π/2, i.e. for the coherence length D=C.

In an equivalent manner, the Fresnel phase-shift $\Phi_F$ due to the total reflection of each wave on the surfaces F of the plate P illustrated in FIG. 1 adds an additional phase-shift of π at each inflection point in order to reset the propagation phase-shift, i.e. π+π=0 modulo 2π. The Fresnel phase-shift thus allows the value 0 modulo 2π to compensate the phase-shift between the three waves Δk D/2=Δk C/2=π/2 due to the propagation in the nonlinear optical material M each time that the three waves $O_1$, $O_2$ and $O_3$ have travelled in the material the periodic distance equal to the coherence length D=C, or an odd number of coherence lengths C, 3C, 5C, and so on, according to the above mentioned article by R. Haidar et al.

According to the invention, instead of attempting to reach a maximum efficiency with the quasi-phase matching, the periodic distance D between two successive bounces R of waves $O_1$, $O_2$ and $O_3$ is strictly lower than the coherence length C, so that the conversion efficiency η according to expression (3) on a given segment between two bounces by total reflection or by domain inversion does not reach the inflection point at Δk D/2=Δk C/2=π/2. In other words, the conversion efficiency according to the invention does not nullify or inverse its progression, as is the case according to the prior art and always increases according to the propagation phase-shift. The technique according to the invention can be called as "Fractional Phase Matching" FPM because the distance D is a fraction of the coherence length C, i.e. D<C. The invention leverages each segment in terms of linear conversion efficiency.

Thus, in reference to FIG. 5, the invention can only be realised under the condition that the chose phase-shifting procedure, for example the Fresnel phase-shift $\Phi_F$, catches propagation phase-shift Δk D that is strictly less than π, i.e. D<C=π/Δk.

Figure 6:
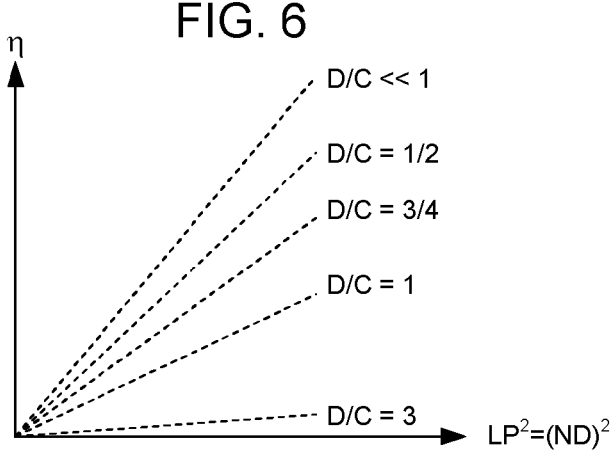
FIG. 6 is a diagram of the conversion efficiency as a function of the square of the length of the nonlinear optical material for various periodic rephasing distance ratios on the coherence length.

According to expression (3) and as shown in FIG. 6, the lower the periodic rephasing distance D defining the length of a basic segment between two successive bounces R, the higher the overall conversion efficiency will be for a given length LP=ND of material M. When the distance D heads towards 0, the ideal situation of the perfect phase matching PPM is obtained: the incident waves $O_1$ and $O_2$ remain in phase with the generated wave $O_3$ during the entire trajectory of the material, and the propagation phase-shift is therefore permanently compensated so that the conversion efficiency remains locked at the best increase pitch that is the source pitch. Nevertheless, the perfect phase matching requires the use of birefringent material that is not easily available.

Figure 7:
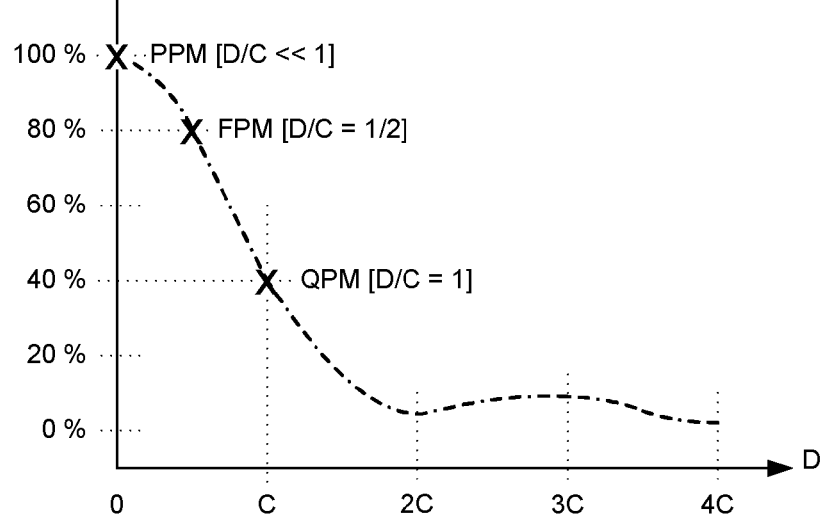
FIG. 7 is a diagram of the conversion efficiency, expressed as a percentage with respect to perfect phase matching, as a function of the periodic rephasing distance in order to show the significant increase in linear efficiency according to the fractional phase matching of the invention.

According to FIG. 7, the conversion efficiency according to the fractional phase matching FPM of the invention can reach approximate 80% for a periodic rephasing distance D equal to a coherence semi-length C. The FPM efficiency is thus much higher than the conversion efficiency according to quasi-phase matching QPM of approximately 40%, but for a periodic distance equal to the coherence length, i.e. twice the periodic distance of the invention.

The wave generation device according to the invention is based on the total internal reflection at each bounce R on one of the major surfaces F of the plate P. The Fresnel phase-shift $\Phi_F$ can reach all the values between 0 and 2π, and can compensate any propagation phase-shift Δk D between the three waves, with D<C, so that the sum of these two phase-shifts is equal to 0 modulo 2π.

As an example, from two incident collinear monochromatic electromagnetic waves $O_1$ and $O_2$ with identical wavelengths $\lambda_1$ and $\lambda_2$, for example, equal to λ=10.6 μm corresponding to a basic frequency F=$\omega_1$/2π=$\omega_2$/2π=ω/2π, the device of the invention generates the second harmonic 2F=2ω/2π as the frequency of a third monochromatic electromagnetic wave $O_3$ with a wavelength of $\lambda_3$=5.3 μm. A combined study of the fractional phase-matching FPM and wave guiding conditions imposes three discrete operation points, which translates in terms of geometric characteristics of the plate P into a wavelength converter. The plate P is, according to a preferred example, made of an isotropic semiconductor material M such as gallium arsenide GaAs. The coherence length $$C=\pi/\Delta k=\pi/(k_3-2k)=1/(2n_3/\lambda_3-4n/\lambda)$$

being approximately a hundred micrometers, specifically 85.83 μm, the maximum thickness t of the plate P is approximately fifty micrometers, typically t=46 μm. This thickness is obtained, for example, by mechanochemical polishing of the plate. The polarization configuration of the waves $O_1(\omega)$, $O_2(\omega)$ and $O_3(2\omega)$ is pps, i.e. the incident waves $O_1$ and $O_2$ are polarized in parallel to the incident plane and the generate wave $O_3$ is polarized in an orthogonal manner to the incident plane. The total internal reflection angle α of the three waves $O_1(\omega)$, $O_2(\omega)$ and $O_3(2\omega)$ is approximately 17.9° and greater than the total reflection critical angles in the gallium arsenide respectively for the three angles $O_1(\omega)$, $O_2(\omega)$ and $O_3(2\omega)$. The thickness t is therefore equal to the product of the periodic distance D and the cosine value of the reflection angle α, i.e. a fraction D/C=t/C(cos α) of approximately ½.

According to other polarization configurations sss and sps, or pss, for which the generated wave $O_3$ is polarized in an orthogonal manner to the incident plane, the incident waves $O_1$ and $O_2$ are polarized in an orthogonal manner to the incident plane, or are polarized respectively in an orthogonal manner and in parallel to the incident plane. According to yet another polarization configuration ssp, ppp, and spp, or psp, for which the generated wave $O_3$ is polarized in parallel to the incident plane, the incident waves $O_1$ and $O_2$ are polarized in an orthogonal manner or in parallel to the incident plane, or are polarized respectively in an orthogonal manner and in parallel to the incident plane.

The invention is not limited to the embodiment described above and the nonlinear optical medium can be a fluid, liquid, or gas, optically nonlinearly enclosed within a housing in which a wall offers a wavelength converter input end that is transparent to the first and second incident waves $O_1$ and $O_2$ and another wall offers a wavelength converter output end that is transparent to the third generated wave $O_3$.

What we claim is:

1. A method of generating, from first and second collinear incident monochromatic waves crossing a nonlinear optical medium, a third monochromatic wave, the method comprising applying the first and second waves to the medium that induces between the three waves a propagation phase-shift having a value $\pi$ in response to the three waves travelling a coherence length in said medium and that is compensated at the value 0 modulo $2\pi$ in response to said three waves travelling a periodic distance in said medium, said periodic distance being less than the coherence length.

2. A method according to claim 1, further including causing said three waves to have a propagation phase shifting compensated at the value 0 modulo $2\pi$.

3. A method according to claim 2, wherein the three waves are caused to have the compensated propagation phase shifting by applying the three waves to parallel reflecting surfaces that are downstream of and border said nonlinear optical medium and are removed from the medium by a thickness less than the periodic distance to cause a total internal reflection of said three waves.

4. A method according to claim 1, wherein said nonlinear optical medium is a fluid enclosed within a housing having a wall transparent to said first and second incident monochromatic waves and said third monochromatic wave.

5. A method according to claim 1, wherein said periodic distance is approximately half said coherence length.

6. A method according to claim 1, wherein said first and second incident monochromatic waves have equal wavelengths.

7. A wave generating device including a nonlinear optical medium adapted to have two collinear incident monochromatic waves injected therein, the medium being arranged to be responsive to the waves by generating a monochromatic wave and inducing between the three waves a propagation phase-shift that (a) has a value $\pi$ in response to the three waves travelling a coherence length in said medium and (b) is compensated at the value 0 modulo $2\pi$ each time said three waves have travelled a periodic distance in said medium, said periodic distance being less than the coherence length.

8. A device according to claim 7, wherein said nonlinear optical medium has two large parallel surfaces arranged so said waves are reflected between them by a reflection angle greater than the total critical reflection angles in said nonlinear optical medium for said three waves, said surfaces being spaced from each other by the thickness of the medium that is equal to the product of the periodic distance and the cosine of said reflection angle.

9. A device according to claim 7, wherein said periodic distance is approximately half said coherence length.

10. A device according to claim 7, wherein said nonlinear optical medium is selected from a group including a semiconductor and a ferroelectric material and is in the form of a plate.

11. A device according to claim 10, wherein said plate has a thickness less than approximately 50 µm.

12. A device according to claim 7, further comprising a first prism for injecting said two incident monochromatic waves in said medium and a second prism for extracting from said medium the monochromatic wave to be generated.

13. A device according to claim 7, comprising a first grating coupler for injecting said two incident monochromatic waves in said medium and a second grating coupler for extracting from said medium the monochromatic wave to be generated.

14. A device according to claim 7, comprising an acceptance cone for injecting said two incident monochromatic waves in said medium and an output cone for extracting from said medium the monochromatic wave to be generated.

15. A device according to claim 7, comprising a prism and a grating coupler, said prism or grating coupler being arranged for injecting said two incident monochromatic waves in said medium and the other of said prism or grating coupler being arranged for extracting from said medium the monochromatic wave to be generated.

16. The device of claim 7 further including an optical source arrangement for deriving and injecting the two collinear monochromatic waves into the medium.

* * * * *